United States Patent

Rohs et al.

Patent Number: 6,019,206
Date of Patent: Feb. 1, 2000

[54] TORSIONAL OSCILLATION DAMPER

[75] Inventors: Ulrich Rohs; Hans Rohs, both of Düren; Dietmar Heidingsfeld, Aachen, all of Germany

[73] Assignee: Rohs-Voigt Patentverwertungsgesellschaft GmbH, Düren, Germany

[21] Appl. No.: 09/016,628

[22] Filed: Jan. 30, 1998

[30] Foreign Application Priority Data

Jan. 31, 1997 [DE] Germany ............. 197 03 534
Mar. 3, 1997 [DE] Germany ............. 197 08 327

[51] Int. Cl.[7] .................................................. F16D 3/14
[52] U.S. Cl. ........................ 192/213.2; 192/213.1; 192/201
[58] Field of Search ................ 192/201, 213.1, 192/213.11, 213.2, 213.21

[56] References Cited

U.S. PATENT DOCUMENTS

| | | | |
|---|---|---|---|
| 4,138,003 | 2/1979 | Malloy | 192/3.29 |
| 4,548,311 | 10/1985 | Lech, Jr. | 192/201 |
| 4,638,684 | 1/1987 | Maucher | 192/201 X |
| 4,655,337 | 4/1987 | Carmillet et al. | 192/213.22 X |
| 4,698,045 | 10/1987 | Billet et al. | 192/201 X |
| 4,892,008 | 1/1990 | Naudin et al. | 192/213.2 X |
| 4,924,990 | 5/1990 | Takeuchi | 192/201 |
| 5,201,394 | 4/1993 | Suzuki | 192/201 |
| 5,246,399 | 9/1993 | Yanko et al. | 192/213.1 X |
| 5,374,218 | 12/1994 | Reik et al. | 192/213.21 X |
| 5,590,752 | 1/1997 | Takehira et al. | 192/208 |
| 5,839,962 | 11/1998 | Rohs et al. | 192/201 X |

FOREIGN PATENT DOCUMENTS

| | | |
|---|---|---|
| 0797022 | 9/1997 | European Pat. Off. . |
| 38 12 275 A1 | 11/1988 | Germany . |
| 196 11 268 A1 | 9/1997 | Germany . |

*Primary Examiner*—Charles A Marmor
*Assistant Examiner*—Ha Ho
*Attorney, Agent, or Firm*—Henry M. Feiereisen

[57] ABSTRACT

A torsional oscillation damper, in particular a friction disk damper, includes a primary part, a secondary part rotatable with respect to the primary part, an intermediate disk disposed between the primary part and the secondary part. Acting upon the intermediate disk are tangential compression springs and pre-damping springs, with the tangential compression springs disposed tangentially between the secondary part and the intermediate disk, and the pre-damping springs disposed between the primary part and the intermediate disk.

9 Claims, 4 Drawing Sheets

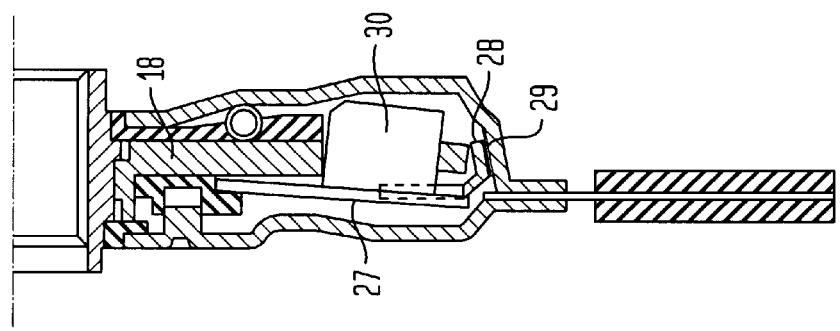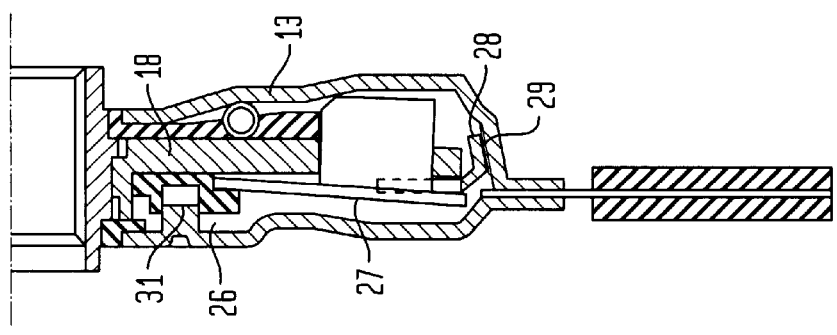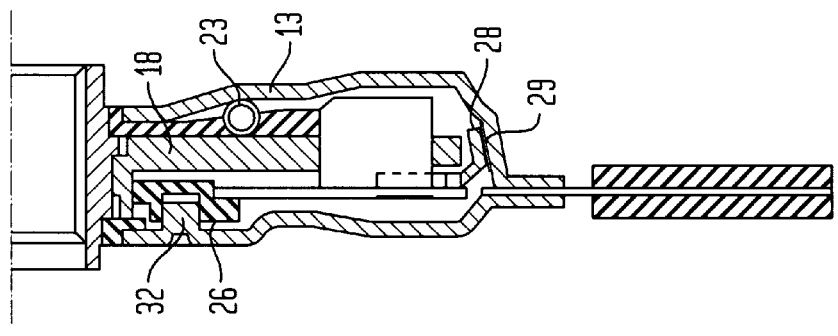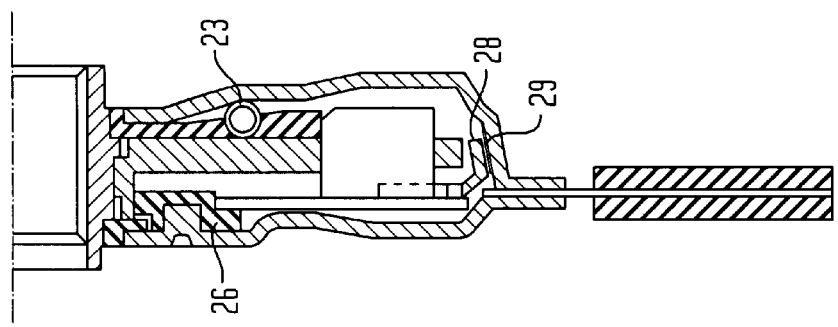

TORSIONAL OSCILLATION DAMPER

BACKGROUND OF THE INVENTION

The present invention refers generally to a torsional oscillation damper, especially a friction disk damper, and more particularly to a torsional oscillation damper generally located between the engine and the transmission or other output unit of a motor vehicle to absorb torsional vibrations as generated e.g. by engine firing pulsations.

Conventional torsional oscillation dampers, especially those of the friction disk damper type, are widely used and typically so designed as to have incorporated between the primary part and the secondary part an intermediate disk which is acted upon by tangential compression springs, on the one hand, for resiliently connecting the primary part and the intermediate disk, and pre-damping springs, on the other hand, for resiliently connecting the intermediate disk with the secondary part. When the engine runs idle, no significant torque acts between the primary part and the secondary part so that the intermediate disk is fixedly connected to the primary part, while small vibrations are absorbed by the pre-damping springs between the intermediate disk and the secondary part. In order to avoid resonance, damping mechanisms are provided between the primary part and the intermediate disk and between the primary part and the secondary part.

In idle operation, the tangential compression springs and the intermediate disk form a fixed interconnected unit so that the secondary part has only a small mass and thus is relatively sensitive to vibrations.

SUMMARY OF THE INVENTION

It is thus an object of the present invention to provide an improved torsional oscillation damper, obviating the afore-stated drawbacks.

In particular, it is an object of the present invention to provide an improved torsional oscillation damper which reduces vibrations of the secondary part during idle operation.

These objects, and others which will become apparent hereinafter, are attained in accordance with the present invention by positioning the tangential compression springs between the secondary part and the intermediate disk and the pre-damping springs between the primary part and the intermediate disk.

By positioning the tangential compression springs and the pre-damping springs in accordance with the present invention, the intermediate disk and in particular the mass of the tangential compression springs are connected with the secondary part so that the primary part is freed from any association with the heavy tangential compression springs during idle operation. Thus, as all components of the torsional oscillation damper, with the exception of the primary part, are associated to the secondary part, the secondary part receives a great moment of inertia that results in a very good disengagement at idling. The secondary part can be configured very heavy and is therefore less sensitive to vibrations.

Advantageously, the pre-damping springs has a characteristic which is so adjusted that the tangential compression springs respond before the pre-damping springs form a stop. By so matching the tangential compression springs and pre-damping springs to one another, an impact-free torque transmission from the primary part onto the secondary part is effected when a torque is generated. In initial phase, the pre-damping springs are compressed. Before being fully compressed or forming a stop between the primary part and the intermediate disk, the tangential compression springs are already slight compressed to effect a smooth load transfer at rising torque from the primary part to the secondary part.

In accordance with the present invention, the primary part and the intermediate disk can rotate undamped relative to one another. Normally, provision of a damping mechanism between the primary part and the secondary part is sufficient, with the damping mechanism being of the variable type. Preferably, the damping mechanism is speed-dependent as well as torque-dependent. An example of a damping mechanism of this type is described in German Pat. No. DE 196 11 268.0.

According to another feature of the present invention, the torsional oscillation damper includes an arrangement of tangential compression springs in parallel disposition, preferably of different spring characteristic in order to attain a smooth torque transfer within a tight structural space.

Suitably, the pre-damping springs which are relatively small in comparison to the tangential compression springs are arranged radially inwardly with respect to the tangential compression springs so that the tangential compression springs can then be arranged at the outer margin of the secondary part, preferably in U-shaped pockets thereof.

BRIEF DESCRIPTION OF THE DRAWING

The above and other objects, features and advantages of the present invention will now be described in more detail with reference to the accompanying drawing in which:

FIGS. 4a to 4d are schematic, sectional cutaway views, on an enlarged scale, of four different operational phases of the torsional oscillation damper of FIG. 2.

DETAILED DESCRIPTION OF PREFERRED EMBODIMENTS

Figure 1A:
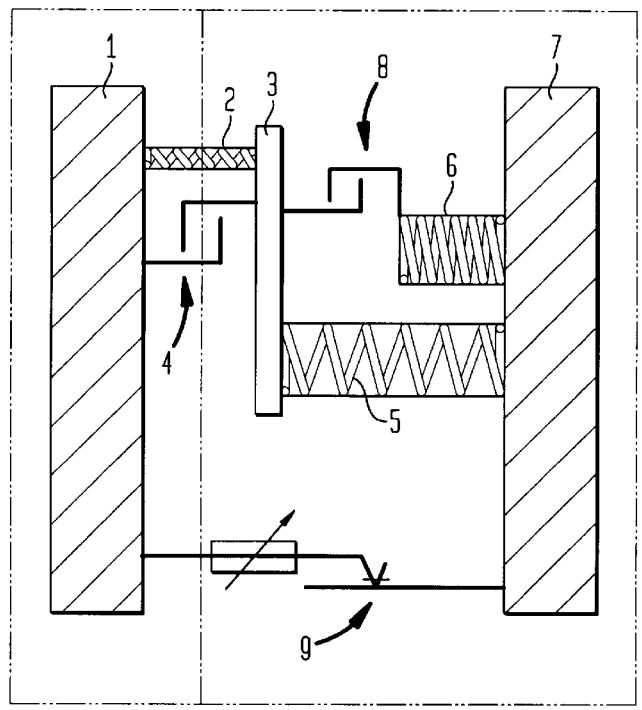
FIG. 1a is a schematic, partially cross sectional view of a torsional oscillation damper in accordance with the present invention.
Figure 1B:
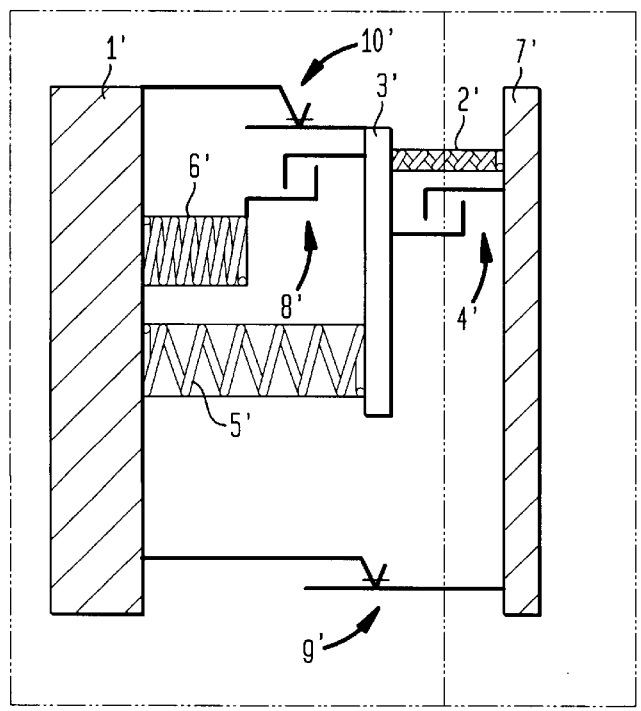
FIG. 1b is a schematic, partially cross sectional view of a conventional torsional oscillation damper.

Turning now to the drawing, and in particular to FIGS. 1a and 1b, there are shown schematic illustrations of a torsional oscillation damper according to the present invention and a conventional torsional oscillation damper for comparison to explain in general the differences therebetween. The torsional oscillation damper according to the present invention, includes a primary part 1 which is connected by pre-damping springs 2 to an intermediate disk 3. Reference numeral 4 denotes schematically a stop which is positioned between the primary part 1 and the intermediate disk 3. Two compression springs 5, 6 in parallel disposition connect the intermediate disk 3 with a secondary part 7, with the compression spring 5 being directly arranged between the intermediate disk 3 and the secondary part 7, and with a stop 8 being formed between the intermediate disk 3 and the compression spring 6 so that the compression spring 6 responds only after the compression spring 5 is compressed to a certain extent.

A damping mechanism 9 is further arranged between the primary part 1 and the secondary part 7 and effects a damping action in dependence on speed and torque.

Unlike the torsional oscillation damper according to the present invention, a conventional torsional oscillation damper includes a primary part 1' which is directly connected to compression springs 5', 6' acting upon an intermediate disk 3', as shown in FIG. 1b. The stop 8' between the compression spring 6' and the intermediate disk 3' assumes the same function as stop 8 in the torsional oscillation damper of FIG. 1a. A pre-damping spring 2' and a stop 4' are arranged between the intermediate disk 3' and the secondary part 7' for interaction in a same manner as described with respect to the torsional oscillation damper of FIG. 1a. Further provided between the primary part 1' and the secondary part 7' is a damping mechanism 9', and a damping mechanism 10' is arranged between the primary part 1' and the intermediate disk 3'.

A comparison between the illustrations of FIG. 1a and FIG. 1b clearly demonstrates that in the conventional torsional oscillation damper, the primary part 1' forms at idling with the compression springs 5' and 6' as well as the intermediate disk 3' an interconnected mass while in the torsional oscillation damper according to the present invention, the respective mass of compression springs 5, 6 and intermediate disk 3 form with the secondary side an interconnected mass at idling.

Figure 2:
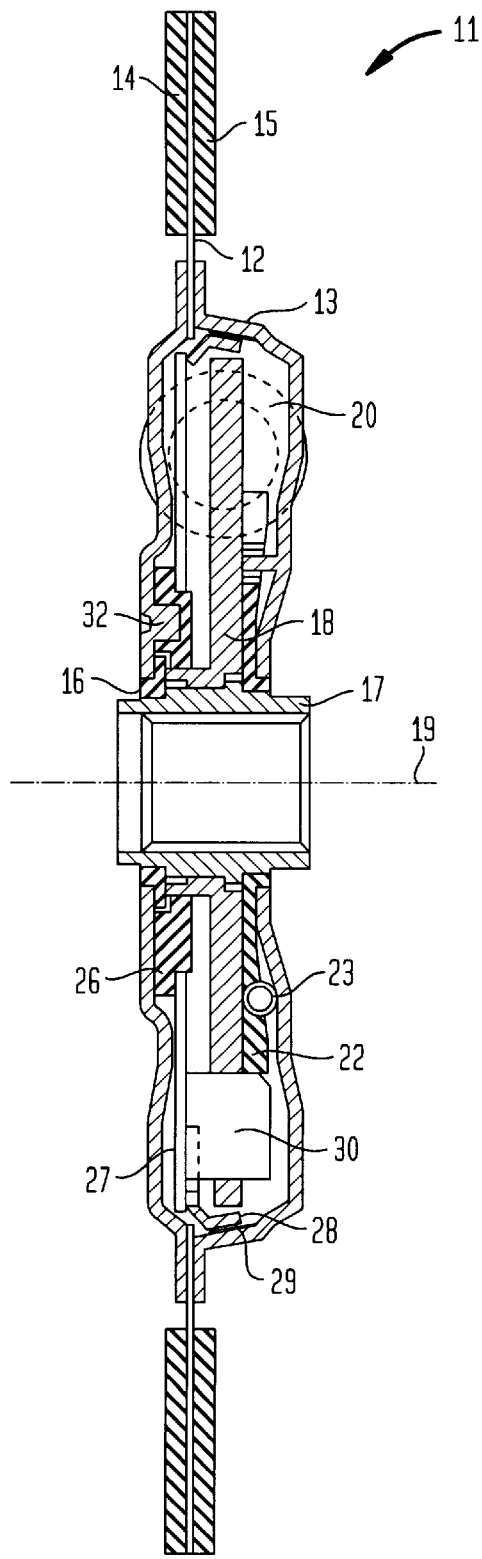
FIG. 2 is an axial longitudinal section of a torsional oscillation damper of the friction disk type.

Referring now to FIG. 2, there is shown an axial longitudinal section of a torsional oscillation damper of the friction disk type with pre-damping, in accordance with the present invention, generally designated by reference numeral 11. The friction disk damper 11 is provided at its radial outer margin with a sheet metal ring 12 which forms part of a primary part 13 and is interposed between facing rubbing surfaces of a friction element 14 of a flywheel (not shown) positioned at the input side and a friction element 15 of a clutch (not shown) at the output side. The primary part 13 is formed by a hollow disk-shaped housing which is rotatably mounted via plastic bearings 16 on a hub 17 of a secondary part 18, with the hub 17 being secured on a driven shaft (not shown) that is positioned at the output side of the oscillation damper and rotating about an axis 19.

The secondary part 18 is of substantially disk-shaped configuration and supported in generally centered disposition within the primary part 13. A plurality of tangentially arranged, relatively large compression springs 20 are positioned at a radial distance to the axis of rotation 19 and received in pockets 21 of the primary part 13 so as to resiliently couple the primary part 13 with the secondary part 18. The compression springs 20 are so arranged as to permit a clearance over an "inactive torsional angle" of e.g. 5° between the primary part 13 and the secondary part 18.

Figure 3:
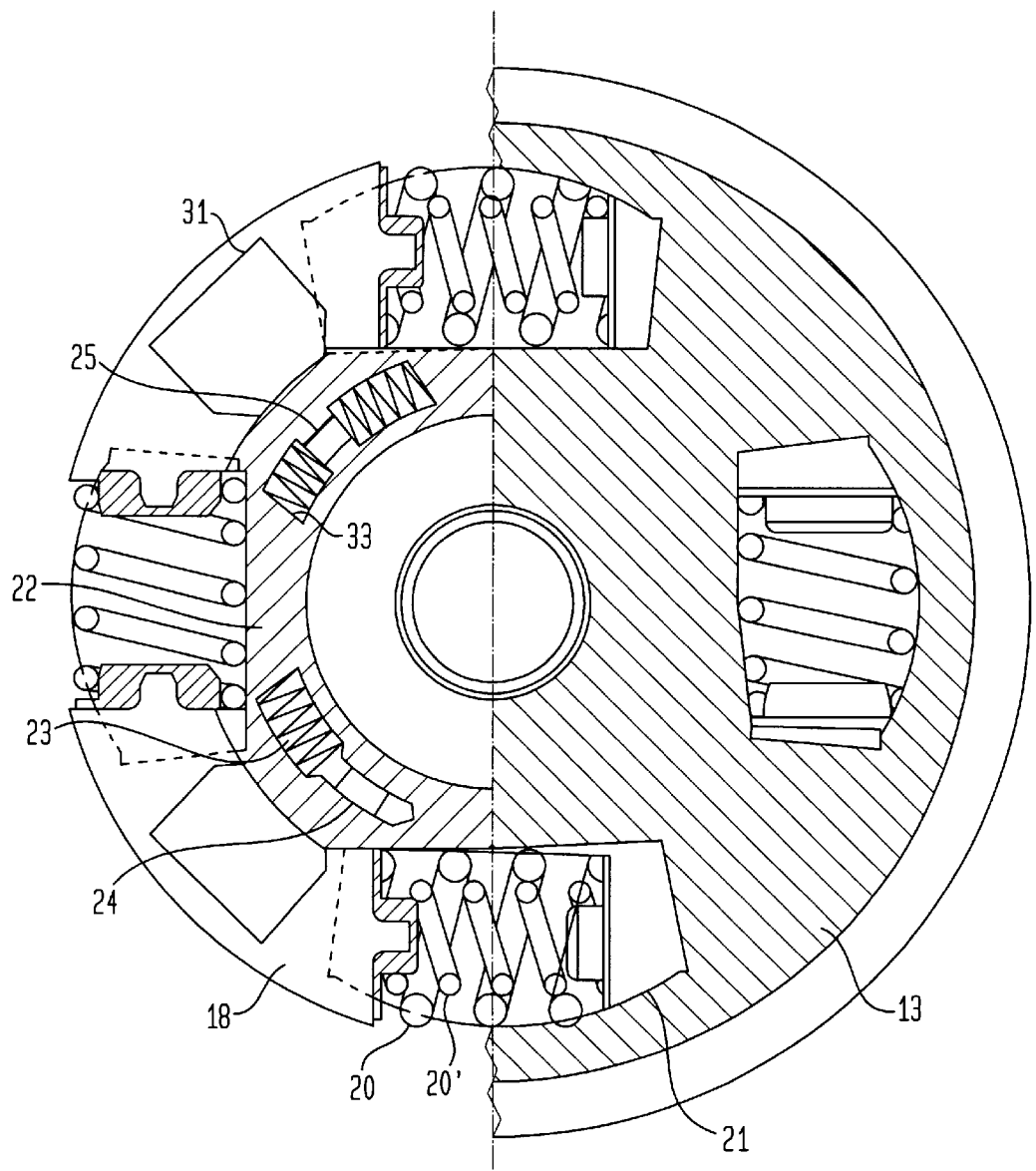
FIG. 3 is a partially sectional, top plan view of the torsional oscillation damper of FIG. 2.

As shown in conjunction with FIG. 3, the secondary part 18 supports an intermediate disk 22 which is connected by pre-damping springs 23 with the primary part 13. The intermediate disk 22 is made of plastic material and is formed about its perimeter with spaced pockets 33 for housing radially arranged pre-damping springs 23 which interact with stops 24, 25 of the primary part 13 when the secondary part 18 rotates relative to the primary part 13. The intermediate disk 22 is connected with the secondary part 18 via the compression springs 20.

As shown in FIG. 2, a non-rotatable plastic ring 26 is secured on the side opposite to the pre-damping springs 23 for axial displacement relative to the primary part 13. The plastic ring 26 supports a spider spring 27 which is formed with four fingers (not shown) projecting outwards and evenly spaced about the circumference to act upon a cone-shaped friction element 28 such that the friction element 28 is pressed by the spider spring 27 at an acute angle with respect to the friction surface 29 formed in the radially outermost inner circumferential surface of the primary part 13. Each finger of the spider spring 27 supports a flyweight 30 which is secured for axial displacement in a pocket 31 of the secondary part 18.

The plastic ring 26 together with the spider spring 27 is axially shifted in dependence on the rotational disposition between primary part 13 and secondary part 18 by a lobe 32, preferably several lobes, projecting inwardly from the primary part 13 and interacting with the plastic ring 26 via a slanted interface between the plastic ring 26 and the lobes 32 so that the pre-load of the friction element 28 is adjusted in a torque-dependent fashion.

The operation of the friction disk damper will now be described with reference to FIGS. 4a to 4d by four distinct operational stages.

FIG. 4a shows the operational phase at idling. As no torque acts between the primary part 13 and the secondary part 18, the plastic ring 26 occupies its left position and bears via the slanted interface upon the lobes 32 of the primary part 13, and the friction element 28 does not form any contact with the friction surface 29. Damping is substantially zero. Also, since there is no torque between the primary part 13 and the secondary part 18, the pre-damping springs 23 are not responsive.

FIG. 4b shows the situation at low speed and low torque. As a result of the small torque and the slanted interface between the plastic ring 26 and the lobes 32, the plastic ring 26 is slightly shifted by the lobes 32 to the right so that the friction element 28 is forced into engagement with the friction surface 29, resulting in a small damping action. At the same time, the pre-damping springs 23 respond as a consequence of a rotation of the primary part 13 relative to the secondary part 18 and are compressed during generation of a very small torque. The pre-damping springs 23 exhibit a hardness so adjusted that the compression springs 20 respond before the pre-damping springs 23 are fully compressed. As further shown in FIG. 3, positioned in every other pocket 21 is a further compression spring 20' which is positioned parallel to the compression spring 20 and has a spring characteristic so selected as to respond after initial compression of the compression spring 20 and to interact with the compression spring at higher torque. Persons skilled in the art will understand that incorporation of a compression spring 20' in every second pocket 21 is done by example only, as it is certainly within the scope of the invention to install a compression spring 20' also in each pocket 21 or in any other suitable arrangement.

FIG. 4c shows the situation at higher torque and low speed. As a consequence of the increased torque, the primary part 13 is displaced considerably relative to the secondary part 18 so that the lobes 32 force the plastic ring 26 completely towards the right side. The spider spring 27 is pressed with increased force onto the friction element 28 which in turn cooperates with the friction surface 29 to effect a damping action. This operational phase attains a maximum damping action.

FIG. 4d illustrates an operational phase at great torque and high speed. As a consequence of the increased speed, the flyweight 30 is acted upon by a centrifugal force and effects a displacement of the spider spring 27 in the radially outer region to the left. This force counteracts the pressure of the spider spring 27 against the friction element 28 and thereby reduces the contact pressure of the friction element 28 against the friction surface 29.

A further increase of the speed results in a displacement of the flyweight further radially outwards within the pocket 31 of the secondary part 18, until the flyweight 30 impacts the radial outer edge of the pocket 31. In this position, the spider spring 27 is urged to the left to such an extent that no force is exerted upon the friction element 28 which thus becomes disengaged, with the damping action approaching zero.

As shown in the drawing, all components of the friction disk damper, except for the primary part 13, i.e. the housing, are associated to the secondary part which thus can be designed with great moment of inertia, resulting in a superior disengagement at idling.

While the invention has been illustrated and described as embodied in a torsional oscillation damper, it is not intended to be limited to the details shown since various modifications and structural changes may be made without departing in any way from the spirit of the present invention.

What is claimed as new and desired to be protected by Letters Patent is set forth in the appended claims:

1. A torsional oscillation damper, in particular a friction disk damper, comprising:

a primary part on an input side;

a secondary part rotatable with respect to the primary part and positioned at an output side;

an intermediate disk disposed between the primary part and the secondary part;

first spring means acting upon the intermediate disk and disposed between the primary part and the intermediate disk; and second spring means acting upon the intermediate disk and disposed tangentially between the secondary part and the intermediate disk for resiliently connecting the primary part with the secondary part.

2. The damper of claim 1 wherein the first spring means exhibit a characteristic which is so adjusted that the second spring means respond before the first spring means form a stop.

3. The damper of claim 1 wherein the primary part and the intermediate disk rotate undamped relative to one another.

4. The damper of claim 1, and further comprising a variable damping mechanism arranged between the primary part and the secondary part.

5. The damper of claim 4 wherein the damping mechanism is so configured as to be torque-dependent.

6. The damper of claim 1 wherein the second spring means include tangential compression springs and further springs positioned in parallel disposition to the compression springs.

7. The damper of claim 6 wherein the further springs have a characteristic different from a characteristic of the compression springs.

8. The damper of claim 7 wherein the first spring means are arranged radially inwards with respect to the second spring means.

9. The damper of claim 8 wherein the secondary part has an outer margin formed with U-shaped pockets for placement of the second spring means.

* * * * *